(12) United States Patent
Nusca

(10) Patent No.: US 9,388,535 B2
(45) Date of Patent: Jul. 12, 2016

(54) METHOD FOR PRODUCING SYNTHETIC TURFS

(76) Inventor: Roberto Nusca, Arena Metato (IT)

(*) Notice: Subject to any disclaimer, the term of this patent is extended or adjusted under 35 U.S.C. 154(b) by 302 days.

(21) Appl. No.: 12/091,348

(22) PCT Filed: Apr. 12, 2007

(86) PCT No.: PCT/IB2007/000955
§ 371 (c)(1),
(2), (4) Date: Apr. 24, 2008

(87) PCT Pub. No.: WO2008/125895
PCT Pub. Date: Oct. 23, 2008

(65) Prior Publication Data
US 2010/0166984 A1    Jul. 1, 2010

(51) Int. Cl.
*E01C 13/08* (2006.01)
*B32B 9/02* (2006.01)
*B29B 9/12* (2006.01)

(52) U.S. Cl.
CPC . *E01C 13/08* (2013.01); *B29B 9/12* (2013.01); *B32B 9/02* (2013.01); *Y10T 428/23921* (2015.04)

(58) Field of Classification Search
CPC . E01C 13/08; E01C 13/083; E01C 2013/086; B29B 9/00; B29B 9/12; B29B 9/16; B32B 9/02; B32B 9/04; D10B 2505/202; Y10S 273/13
USPC ............... 428/87, 402, 17, 22; 209/659, 660
See application file for complete search history.

(56) References Cited

U.S. PATENT DOCUMENTS

| 4,900,010 | A  | * | 2/1990  | Wengmann et al. ............ 472/92 |
| 6,029,397 | A  | * | 2/2000  | Motz et al. ................. 47/58.1 R |
| 6,173,528 | B1 | * | 1/2001  | Motz et al. ................. 47/58.1 R |
| 6,189,260 | B1 | * | 2/2001  | Kusey et al. ....................... 47/9 |
| 6,242,062 | B1 | * | 6/2001  | de Vries .......................... 428/17 |
| 6,295,756 | B1 | * | 10/2001 | Bergevin .................... 47/1.01 R |
| 6,408,568 | B1 |   | 6/2002  | Kusey et al. |
| 8,221,029 | B2 | * | 7/2012  | Henry et al. .................... 405/36 |

(Continued)

FOREIGN PATENT DOCUMENTS

EP    2206833 A1 *  7/2010
KR     749075 B1 *  8/2007

(Continued)

*Primary Examiner* — Cheryl Juska
(74) *Attorney, Agent, or Firm* — Ladas & Parry LLP

(57) ABSTRACT

Method for making a synthetic turf comprising laying a turf (1) consisting of a mat (2) on which a plurality of blades (3, 3a, 3b, 3c) of synthetic material is woven. An infill material (18) is obtained using the granular and fibrous part (17) of a loose product based on ground coconut, alone or with addition of other material such as rubber in granules or sand or other loose vegetable material such as cork. The raw material based on coconut, having a heterogeneous granulometry set between about 500 micron and several mm, is obtained loading a loose product based on ground coconut by a hopper on a conveyor belt for being fed in a sieve, for example a rotating screen that separates the powder part from the granular and fibrous part. In particular, the powder part of the raw material, is gathered on a conveyor belt and from here sent to a storage reservoir. The granular and fibrous part of the raw material, which represents the main product of the process, is, instead, sent by a conveyor belt to a storage, reservoir from where it is taken for the process to provide infill material for a synthetic turf.

14 Claims, 3 Drawing Sheets

(56) References Cited

U.S. PATENT DOCUMENTS

| | | | |
|---|---|---|---|
| 8,563,099 B2 * | 10/2013 | Gilardi | 428/22 |
| 2001/0007700 A1 * | 7/2001 | de Vries | 428/17 |
| 2003/0161996 A1 | 8/2003 | Prevost | |
| 2007/0248773 A1 * | 10/2007 | Nusca et al. | 428/22 |
| 2008/0124496 A1 * | 5/2008 | Avery | 428/17 |
| 2008/0299331 A1 * | 12/2008 | Gilardi | 428/22 |
| 2010/0055461 A1 * | 3/2010 | Daluise et al. | 428/403 |
| 2010/0294705 A1 * | 11/2010 | Henry et al. | 210/170.07 |
| 2012/0189786 A1 * | 7/2012 | Nusca | 428/17 |

FOREIGN PATENT DOCUMENTS

| | | | |
|---|---|---|---|
| KR | 919458 B1 * | 9/2009 | |
| KR | 919459 B1 * | 9/2009 | |
| WO | 2007010324 | 1/2007 | |
| WO | WO 2008115085 A1 * | 9/2008 | |

\* cited by examiner

METHOD FOR PRODUCING SYNTHETIC TURFS

FIELD OF THE INVENTION

The present invention relates to a method for making synthetic turfs for sporting, recreational or ornamental purposes. For example, the turf according to the invention can be used as surface on which sporting activities can be played such as football, minisoccer, tennis, hockey, American football, golf, athletics, rugby, baseball and other sports that are played on turfs in general.

Furthermore, the invention relates also to a method for making infill material for synthetic turfs.

Finally, the invention relates also to an infill material for synthetic turfs.

BACKGROUND OF THE INVENTION

It is well known that turfs for sport fields such as for soccer, hockey, cricket, rugby, etc. provide a natural turf grown on a ground or substrate. Natural turfs offer high aesthetical, technical and environmental performances.

However, with the use and with time, as well as with unfavourable weather conditions the natural turf quickly wears and requires expensive maintenance work. Unless a worn natural turf is completely restored the field is unaesthetic, irregular, and potentially dangerous for the users.

An intense activity, which normally concerns a sport field, worsens the turf characteristics after each use without enough time for the turf to recover. In particular, the field looses its planarity, uniformity and resistance of its substrates, affecting the athletic performances and endangering the athletes.

For these reasons, synthetic turfs have been developed in the last years, having artificial grass blades and granular filling material, for example sand or resilient material, which presents better performances and steadiness of grip on the ground. Such artificial turfs can be installed on surfaces made of various material, in particular asphalt, and stabilized inert material.

The synthetic turf, in particular, must have physical characteristics and technologic typical of natural turfs such as: the elasticity of the playground, the bounce back properties of the ball or other sport tool, capacity of absorption of hits, tensile and torsion resistance caused by a shoe, resistance against compression and penetration of external bodies, as well as absorption and drainage capacity relatively to meteorological and environmental events. The granular infill materials used to provide the substrate of the synthetic field have in general a heterogeneous granulometry between about 500 microns to several millimeters.

However, the artificial turfs have some technical drawbacks, among which a considerable superheating of the field in addition to environmental modifications with subsequent discomfort for the users. For avoiding the above described drawbacks combined systems have been proposed of mixed natural and artificial turf (see WO2006/008579).

A valid alternative for overcoming this problem is provided by Italian patent application PI2003A000036 of May 28, 2003. In this document, a synthetic turf is described with an infill material formed by a mix of sand, vegetable powdered material and rubber granules, in a first configuration providing a layer of sand, a layer of rubber granules and a layer of vegetable material, and another configuration where the vegetable material and the rubber are distributed above the layer of sand after that they have been already mixed to each other.

With this system, relevant advantages are obtained, reducing remarkably superheating of the turf, owing to the presence of the vegetable material.

In WO2006109110 and WO2007010324 a process is described completely similar to PI2003A000036 to obtain synthetic turfs, which provides the use of vegetable material based on peat and coconut peat as infill material. In particular, the coconut peat comprises both granular and powder parts. The powder part is in a larger quantity than the former and do not exceed 500 micron diameter. This infill material has, however, the drawback of requiring frequent watering, because in the presence of wind, the infill material can be and creating discomfort to the users.

Furthermore, the powder deriving from grinding the coconuts have a high capacity of water retention that, in case of heavy rain, causes flooding of the turf. In particular, while raining the powder parts of the coconut peat follow and plug the drainage holes made of the mat to which the synthetic grass blades are fixed.

In addition, with time the rainwater can cause the powder to compact thus affecting the drainage of the turf and the technical performances thereof.

Such drawbacks are acknowledged in the specification and possible solutions are proposed, such as compacting the powder through mixing, thickening and granulating the powder peat in order to obtain granules that can be used as infill material for synthetic turfs.

However, such operations cause the process to become complex and expensive both for the apparatus necessary for carrying it out and for use of further materials, such as thickening agents.

Furthermore, with time, the granules produced according to the prior art method above described tend to return in the powder form causing the cited drawbacks.

SUMMARY OF THE INVENTION

It is therefore a feature of the present invention to provide a method for making an infill material for synthetic turfs that is easy and cheap with respect to the processes of prior art.

It is another feature of the present invention to provide a method for making a synthetic turf that avoid that powder is present that can be blown away during the use.

It is also a feature of the present invention to provide an infill material for synthetic turfs that has the above described advantages.

These and other features are accomplished with one exemplary method, according to the invention, to provide synthetic turfs comprising the steps of:
  providing a mat, or primary layer, on which a plurality of blades of synthetic material are woven so that blades are created that protrude from one side of the mat creating a turf;
  laying down an infill material among said blades, said infill material comprising a measured amount of a loose product obtained from raw material based on ground coconut;
  whose main feature is that said loose product comprises substantially the sole granular and fibrous part contained in said raw material based on ground coconut, said granular and fibrous part being obtained causing said raw material based on ground coconut to undergo a step of separation of said granular and fibrous part from a powder part.

In particular, the granular and fibrous part contained in said loose product is obtained by sieving said raw material based on ground coconut, said granular and fibrous part having a granulometry larger than 500 micron (μm) for 90% by weight.

Advantageously, the granular and fibrous part has the following granulometry:
between 20% and 40% by weight set between 0.8 mm and 1.25 mm;
between 15% and 35% by weight set between 1.25 mm and 1.60 mm;
between 50% and 70% by weight larger than 1.6 mm.

In particular, the infill material can comprise, in addition to said loose product comprising substantially the sole granular and fibrous part contained in said raw material based on ground coconut, a further material selected from the group comprised of:
selected sand, preferably ventilated sand having controlled granulometry, in particular set between 0.4 and 1.25 mm;
a bulk of the raw material of natural vegetable origin, in particular, cork, preferably with granulometry set between 1.0 and 20 mm;
a synthetic resilient loose material in elastomeric granules, in particular with granulometry set between 0.8 and 2.5 mm and preferably between 1.0 and 2.0 mm.

Advantageously, the infill material may have a content of granular and fibrous part of the loose ground product based on coconut set between 20% and 90% in volume, preferably between 30 and 80%.

Advantageously, said synthetic resilient loose material is selected from the group comprised of:
rubber granules of first use;
rubber granules of recycled use.

Preferably, said woven blades of synthetic material comprise:
a first group of blades with longer extension, in order to protrude from the infill material,
a second group of blades with shorter extension, in order to result in the infill material without protruding from it.

In particular, according to the final position of the synthetic turf, the step can be provided of adding a measured amount of a surfactant agent on the infill material, said surfactant being adapted to assist the water to percolate through the synthetic turf.

According to another aspect of the invention, a synthetic turf is provided as above defined.

According to a further aspect of the invention, a method for making an infill material for synthetic turfs comprises the steps of:
feeding to separating means a raw material based on ground coconut comprising a granular and fibrous part and a powder part,
separating by said separating means the granular and fibrous part from the powder part of the raw material.

Advantageously, said raw material based on ground coconut is obtained by milling a raw material based on coconut through grinding means obtaining said loose product comprising a granular and fibrous part and a powder part.

Preferably, the separating means comprises sieving means selected from the group comprised of:
a mechanical sieve, in particular, a rotating screen,
an electromagnetic sieve.

In particular, the granular and fibrous part of the loose product represents the portion of the raw material based on ground coconut for making the infill material for synthetic turfs according to the invention. The powder part, instead, of the loose product represents a secondary product of the process for applications in gardening to be used as such or mixed with peat, to provide growth substrates.

BRIEF DESCRIPTION OF THE DRAWINGS

The invention will be now shown with the following description of an exemplary embodiment thereof, exemplifying but not limitative, with reference to the attached drawings wherein.

DESCRIPTION OF A PREFERRED EXEMPLARY EMBODIMENT

Figure 1:
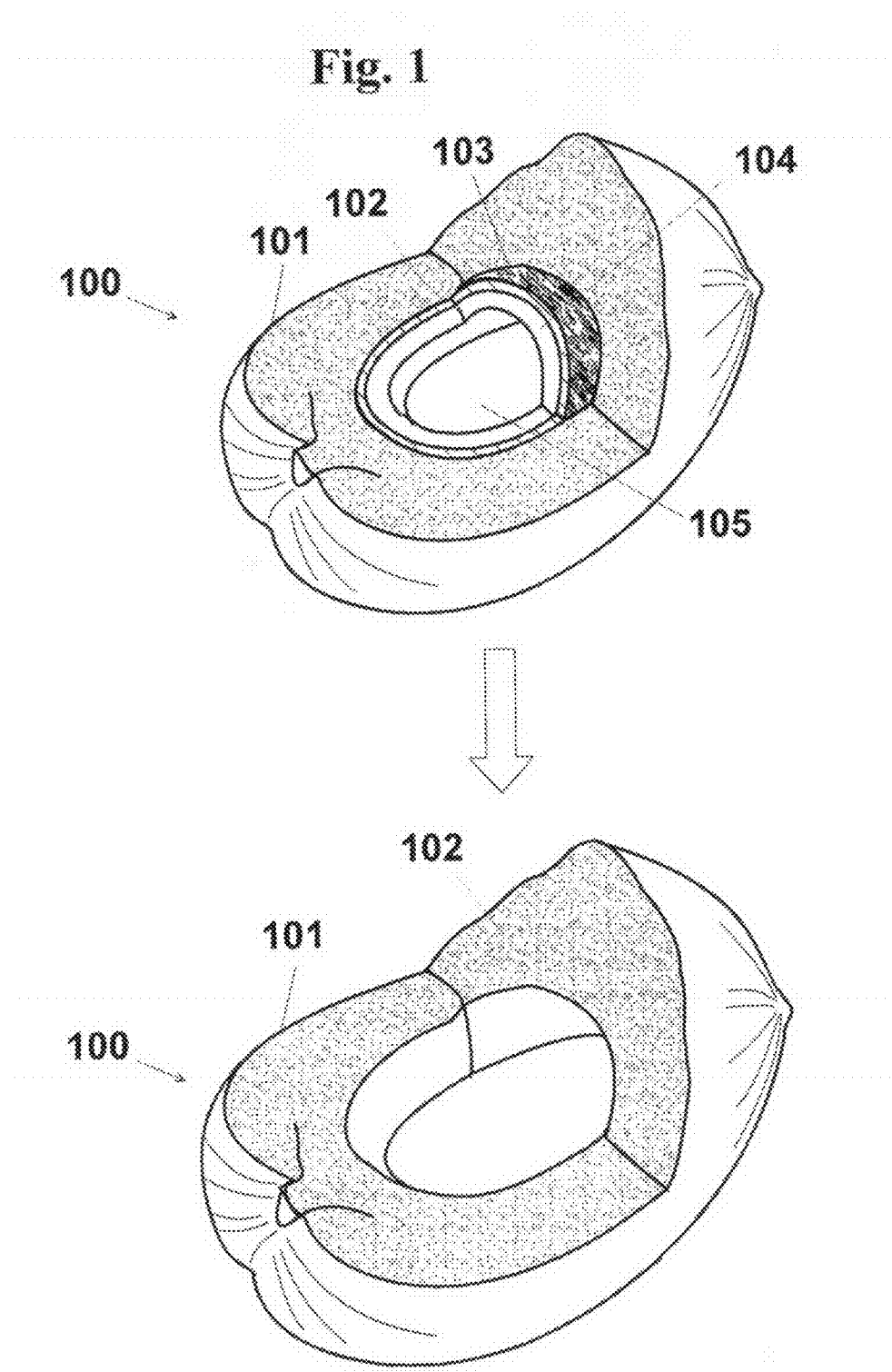
FIG. 1 shows diagrammatically a perspective view of a partially cross sectioned coconut that can be used as a starting material for the method for making a synthetic turf, according to the invention.

With reference to FIG. 1, a coconut 100 comprises, in summary, a thin, smooth epicarp 101, of grey-brownish colour, a fibrous mesocarp 102, normally 4-8 cm thick, and an wooden endocarp 103. The latter represents the actual fruit of the coconut that is useful for the food field. The epicarp 101 and the fibrous mesocarp 102, hereafter generically indicated as material based on coconut 10, are, instead, sent, sometimes with parts of branches and leaves of coconut trees, to a plant for making infill material for synthetic turfs according to the invention.

Figure 2:
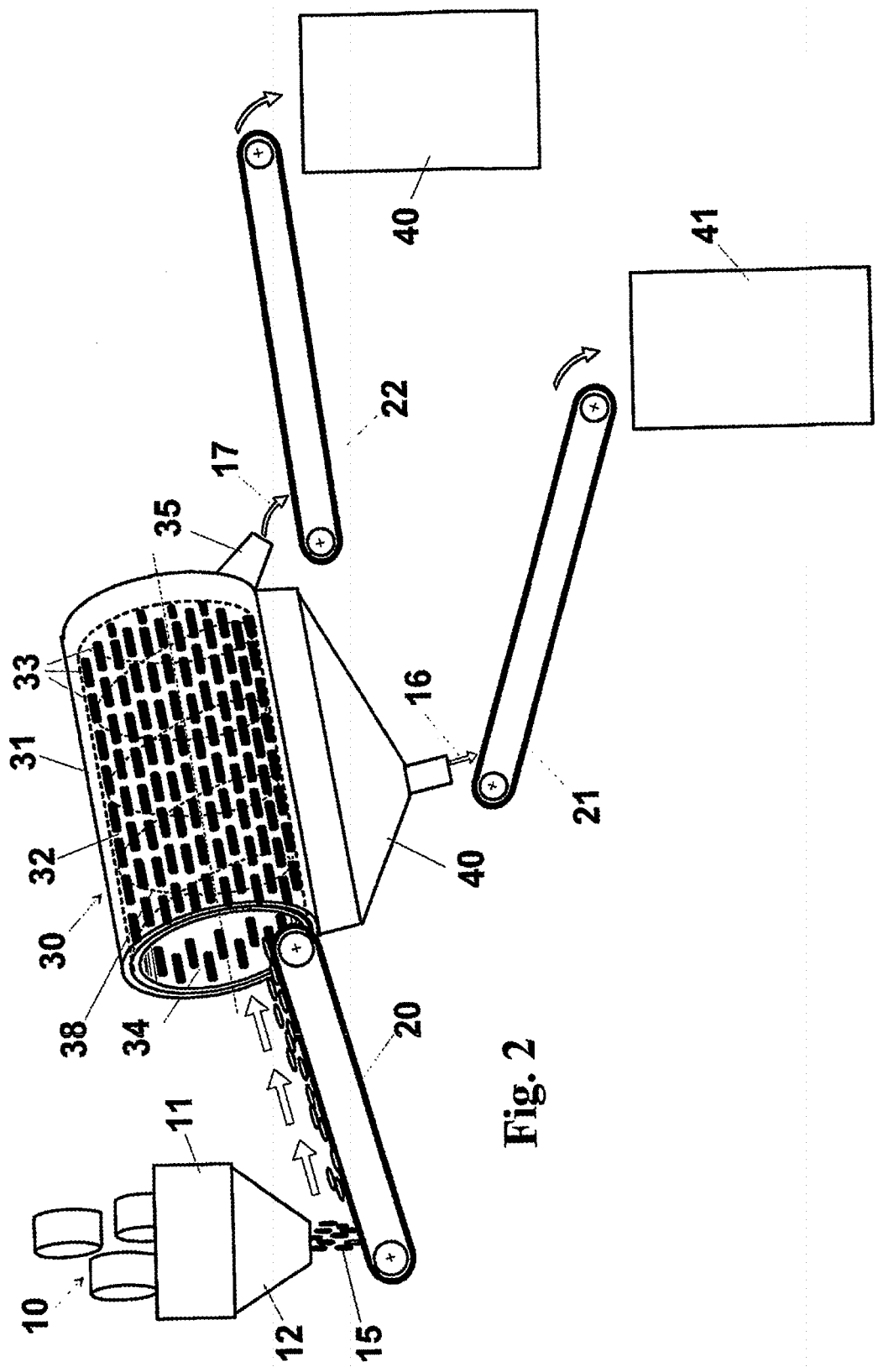
FIG. 2 shows diagrammatically a plant that achieves a preliminary step of the method, according to the invention, to provide a synthetic turf.

In particular, the method for making a synthetic turf, according to the invention, can provide a starting step operated by the plant shown in FIG. 2. This provides feeding raw material based on coconut, for example collected as bales 10, to means for milling such as a hammer mill 11. The latter mills material 10 obtaining, on the one hand, longer fibres that are gathered and used for example for making ropes and mats, and on the other hand a certain amount of fibres of shorter and medium length, hereafter indicated generically as raw material based on ground coconut 15.

Alternatively, the raw material based on ground coconut is ground in places of production and packaged as compressed bales.

The raw material based on ground coconut 15, having a heterogeneous granulometry that extends from a few micron to several mm, and with a powder part having a granulometry less than 500 micron, is loaded by a hopper 12 on a conveyor belt 20 for being fed to a sieve. The latter can be for example a rotating screen 30 comprising an external jacket 31 in which a cylindrical sieve 32 is arranged.

In operative conditions, the cylindrical sieve 32 is subject to a controlled vibration to assist the motion of the powder part 16 of the loose ground product 15 through the apertures thereof. Such apertures have size corresponding to the desired sieving size.

In sieve 32 an Archimedean screw can be mounted, diagrammatically shown in FIG. 1 with dotted line 38, adapted on the one hand to move forward the whole mass assisting the powder part 16 to pass through the sieve 32 and on the other hand to push the granular and fibrous part 17 towards the outlet 35 of the rotating screen, located opposite to an inlet 34. The powder part 16 of the bulk of the raw material, once in sieve 32 hits against the inner wall of the jacket 31 and falls by gravity in a conveyor belt 40 arranged below sieve 32. From conveyor belt 40, the powder part 16 is sent, by a conveyor belt 21, to a storage reservoir 41 for being then used in the gardening field as such, or mixed to peat, to provide growth substrates.

The granular and fibrous part 17 of the bulk of raw material, which represents the main product of the process, is, instead, sent by a conveyor belt 22 to a storage reservoir 43 and from here sent towards the process for laying down the infill material for synthetic turfs, according to the methodology described hereafter.

After the sieving step, the granular and fibrous part can have the following granulometry:
- between 20% and 40% by weight set between 0.8 mm and 1.25 mm;
- between 15% and 35% by weight set between 1.25 mm and 1.60 mm;
- between 50% and 70% by weight larger than 1.6 mm.

Figure 3:
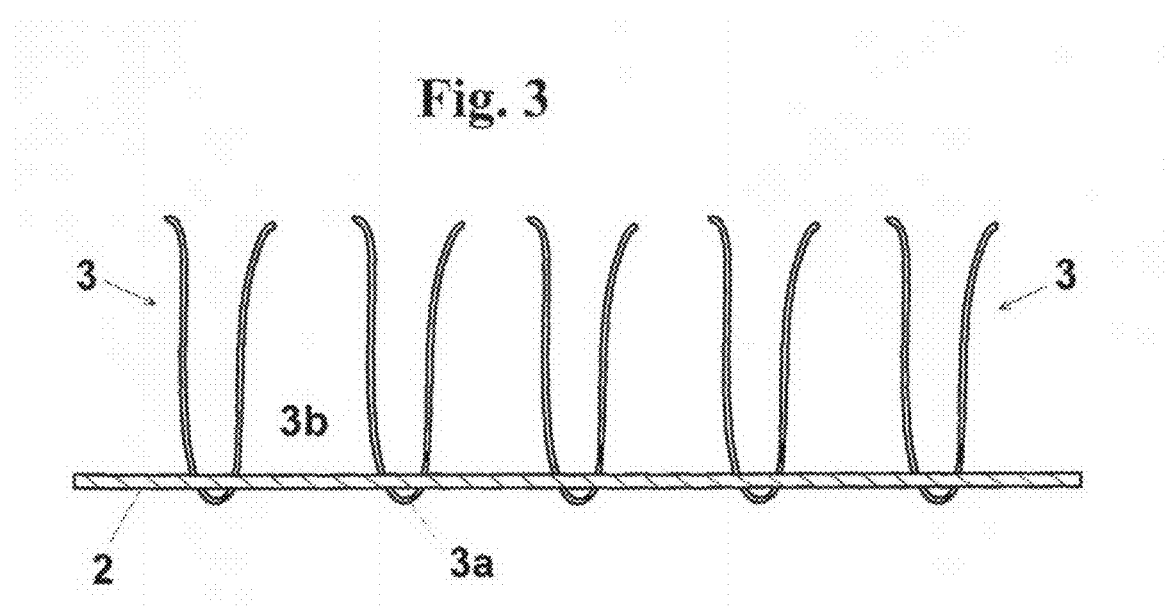
FIGS. 3 and 4 show diagrammatically two successive steps of the method for making the synthetic turf starting from the infill material obtained from the plant shown in FIG. 2.
Figure 4:
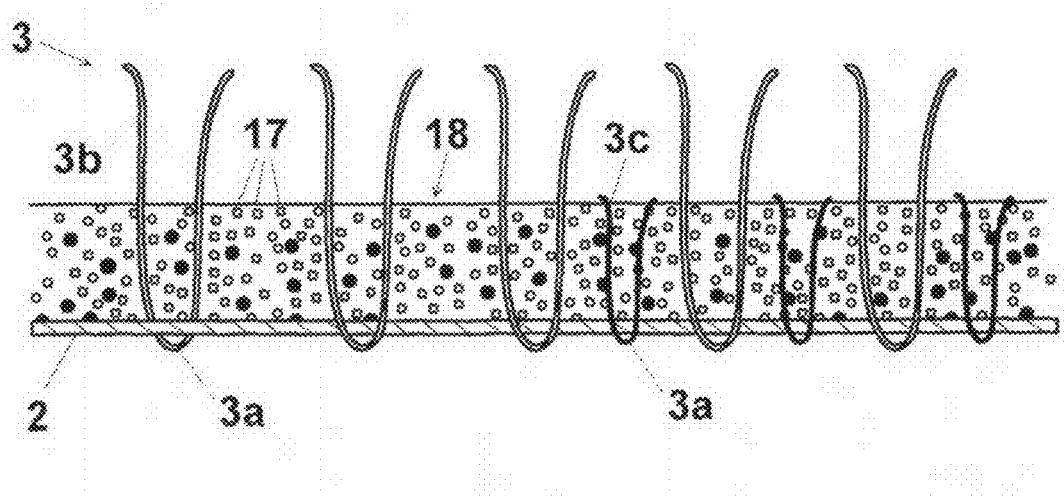

To obtain the complete turf, once laid the mat 1 consisting of a primary mat 2 on which a plurality of blades 3 of synthetic material are woven (FIG. 3), the granular and fibrous part 17 of the loose product based on coconut is arranged on mat 2 as infill material 18 (FIG. 4). The turf may have blades of two or more different heights (3b or 3c)

To provide the infill material 18 the granular and fibrous part 17 can be mixed with other vegetable material, as well as with inert material and/or plastic material. In particular, the infill material can comprise, in addition to the loose product comprising substantially the sole granular and fibrous part contained in the raw material based on ground coconut, also one or more of the following materials:
- selected sand, ventilated sand having controlled granulometry set between 0.4 and 1.25 mm;
- cork or other loose product of natural vegetable origin, with granulometry set between 1.0 and 2.0 mm;
- elastomeric granules or other synthetic resilient loose material, such as rubber granules of first use or of recycled use, with granulometry set between 0.8 and 2.5 mm and preferably between 1.0 and 2.0 mm.

The final infill material may have a content of granular and fibrous part of the loose ground product based on coconut set between 20% and 90% in volume, preferably between the 30 and the 80%. The infill material has as main advantage, which derives from using substantially the sole granular and fibrous part 17 of the loose product based on coconut, to avoid the disadvantages of the prior art such as raising of powder from the turf during its use and compacting the powder in the presence of water.

In particular, according to the final location of the synthetic turf, the possibility can be provided of adding a measured amount of surfactant agent on the infill material, said surfactant being adapted to assist the water to percolate through the synthetic turf.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

The invention claimed is:

1. A synthetic turf comprising:
   a mat, or turf primary layer, on which a plurality of blades of synthetic material are woven, so that blades are formed that protrude from one side of the mat creating a turf;
   an infill loose material arranged between said blades, said infill loose material comprising:
   a base layer comprising sand;
   a mix layer arranged on top of said base layer, said mix layer comprising:
   a measured amount of a resilient loose material;
   a measured amount of a sieved loose product obtained from raw material based on ground coconut;
   wherein said mix layer arranged on top of said base layer is obtained by preliminarily sieving said raw material based on ground coconut, in order to obtain a granular and fibrous coconut material with particle size larger than 500 μm for 90% by weight, and then mixing with said resilient loose material; and
   wherein the coconut material is present in the mix layer in an amount between 20% and 90% by volume.

2. The synthetic turf according to claim 1, wherein said sieved loose product obtained from raw material based on ground coconut has the following particle size:
   between 20% and 40% by weight set between 0.8 mm and 1.25 mm;
   between 15% and 35% by weight set between 1.25 mm and 1.60 mm; and
   between 50% and 70% by weight larger than 1.6 mm.

3. The synthetic turf according to claim 1,
   further comprising a bulk of cork in said mix layer with particle size between 1.0 and 2.0 mm;
   wherein said selected ventilated sand in said base layer has a controlled particle size set between 0.4 and 1.25 mm; and
   wherein said synthetic resilient loose material in said mix layer in elastomeric granules has a particle size set between 0.8 and 2.5 mm.

4. The synthetic turf according to claim 3, wherein said resilient synthetic loose material is at least one material selected from the group consisting of:
   rubber granules of first use; and
   rubber granules of recycled use.

5. The synthetic turf according to claim 1, wherein said woven blades of synthetic material comprise:
   a first group of blades with longer extension which protrude from the infill material,
   a second group of blades with shorter extension which do not protrude from the infill material.

6. The synthetic turf according to claim 1, wherein, on said infill material, a measured amount of a surfactant is added, said surfactant being adapted to assist the water to percolate through the synthetic turf.

7. The synthetic turf according to claim 3, wherein synthetic resilient loose material in elastomeric granules has a particle size set between 1.0 and 2.0 mm.

8. The synthetic turf according to claim 1, wherein the coconut is present in the mix infill layer in an amount between 30% and 80% by volume.

9. A method for making a synthetic turf comprising the steps of:
   providing a mat, or turf primary layer, on which a plurality of blades of synthetic material are woven so that blades are created that protrude from one side of the mat creating a turf;

laying down an infill material among said blades, said infill material comprising a measured amount of selected sand as a base layer, on top of which a mix layer is added, said mix layer comprising:

a measured amount of a resilient loose material;

a measured amount of a sieved loose product obtained from raw material based on ground coconut having a particle size larger than 500 μm for 90% by weight;

wherein said mix layer arranged on top of said base layer is obtained by preliminarily sieving said raw material based on ground coconut, in order to obtain a granular and fibrous coconut material with particle size larger than 500 μm for 90% by weight, and then mixing with said resilient loose material; and wherein the coconut material is present in the mix layer in an amount between 20% and 90% by volume.

10. The method according to claim 9, wherein said raw material based on ground coconut is obtained by milling a raw material based on coconut through grinding means obtaining said loose product comprising a granular and fibrous part and a powder part.

11. The method according to claim 9, wherein said sieving of said granular and fibrous part from a powder part is made through sieving means selected from the group comprised of:

a mechanical sieve, and an electromagnetic sieve.

12. The method according to claim 9, wherein said raw material based on coconut is ground through means for grinding in order to obtain said ground raw material.

13. The method according to claim 9, wherein said loose product is conveyed towards said sieving step through a feeding means comprising a loading hopper and a conveyor belt.

14. The method according to claim 11, wherein said mechanical sieve is a rotating screen.

* * * * *